(12) United States Patent
DiDavide et al.

(10) Patent No.: US 10,011,952 B2
(45) Date of Patent: Jul. 3, 2018

(54) WEAR PROTECTION COATING BASED ON A SYNTHETIC RESIN MATRIX, METHOD FOR THE PRODUCTION THEREOF AND USE THEREOF

(75) Inventors: Maria Cristina DiDavide, Reiden (CH); Reiner Kunz, Laufenburg (DE)

(73) Assignee: CENTER FOR ABRASIVES AND REFRACTORIES RESEARCH & DEVELOPMENT C.A.R.R.D. GMBH, Villach (AT)

( * ) Notice: Subject to any disclaimer, the term of this patent is extended or adjusted under 35 U.S.C. 154(b) by 1150 days.

(21) Appl. No.: 13/133,327

(22) PCT Filed: Dec. 1, 2009

(86) PCT No.: PCT/EP2009/008555
§ 371 (c)(1),
(2), (4) Date: Aug. 17, 2011

(87) PCT Pub. No.: WO2010/075922
PCT Pub. Date: Jul. 8, 2010

(65) Prior Publication Data
US 2011/0300372 A1 Dec. 8, 2011

(30) Foreign Application Priority Data

Dec. 8, 2008 (DE) .................. 10 2008 060 695
Jun. 22, 2009 (DE) .................. 10 2009 030 101

(51) Int. Cl.
| | | |
|---|---|---|
| B32B 5/16 | (2006.01) |
| C08K 3/38 | (2006.01) |
| C08K 3/22 | (2006.01) |
| C08K 3/36 | (2006.01) |
| C09D 161/28 | (2006.01) |
| C08K 3/40 | (2006.01) |
| C08F 2/46 | (2006.01) |
| C08K 3/28 | (2006.01) |
| D21H 19/38 | (2006.01) |
| B44C 5/04 | (2006.01) |
| D21H 27/28 | (2006.01) |
| C09D 7/62 | (2018.01) |
| C08K 3/24 | (2006.01) |
| C08K 3/34 | (2006.01) |
| C08K 9/06 | (2006.01) |
| E04F 15/02 | (2006.01) |

(52) U.S. Cl.
CPC ........... *D21H 19/38* (2013.01); *B44C 5/0476* (2013.01); *C09D 7/62* (2018.01); *D21H 27/28* (2013.01); *C08K 3/22* (2013.01); *C08K 3/24* (2013.01); *C08K 3/34* (2013.01); *C08K 3/40* (2013.01); *C08K 9/06* (2013.01); *E04F 15/02* (2013.01); *Y10T 428/254* (2015.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,928,706 A | | 12/1975 | Gibbons |
| 4,937,127 A | * | 6/1990 | Haenggi et al. .............. 428/148 |
| 5,266,384 A | * | 11/1993 | O'Dell .................. B44C 5/0476 428/207 |
| 5,545,476 A | * | 8/1996 | O'Dell et al. ................ 428/327 |
| 5,707,440 A | * | 1/1998 | Hengchang ............ A61K 6/083 106/35 |
| 6,800,353 B1 | * | 10/2004 | Anderson .............. C09D 5/008 428/141 |
| 8,209,999 B2 | * | 7/2012 | Schumacher ........... C03B 19/06 501/33 |
| 2003/0017355 A1 | | 1/2003 | Wang et al. |
| 2004/0053038 A1 | * | 3/2004 | Kunz ............................ 428/325 |
| 2007/0116927 A1 | | 5/2007 | Schitter et al. |
| 2007/0298216 A1 | * | 12/2007 | Jing et al. ..................... 428/141 |
| 2008/0048557 A1 | * | 2/2008 | Birnstock et al. ............ 313/504 |

FOREIGN PATENT DOCUMENTS

| | | |
|---|---|---|
| CN | 1849225 A | 10/2006 |
| EP | 0 519 242 A1 | 12/1992 |
| EP | 1 319 524 A1 | 6/2003 |
| EP | 1 634 995 A1 | 3/2006 |
| WO | WO 02/45955 A2 | 6/2002 |
| WO | WO 02/066265 | 8/2002 |
| WO | WO 2006/013469 | 2/2006 |
| WO | WO 2008/128702 | 10/2008 |

* cited by examiner

Primary Examiner — Cheng Huang
(74) Attorney, Agent, or Firm — Law Firm of Ursula B. Day (57) ABSTRACT

The invention relates to a wear protection layer comprising a mixture of non-uniform transparent hard material particles, which are stored in a matrix material and which comprise a Mohs hardness of at least 6 and transparent solid material particles, wherein the transparent solid material particles encompass a bi-modal grain size distribution. The invention also relates to a method for producing a wear protection layer as well as the use thereof for producing wear protection surfaces, in particular surfaces on wood fiber boards, which are provided with a a décor.

17 Claims, 2 Drawing Sheets

WEAR PROTECTION COATING BASED ON A SYNTHETIC RESIN MATRIX, METHOD FOR THE PRODUCTION THEREOF AND USE THEREOF

CROSS-REFERENCES TO RELATED APPLICATIONS

This application is the U.S. National Stage of International Application No. PCT/EP2009/008555, filed Dec. 1, 2009, which designated the United States and has been published as International Publication No. WO 2010/075922 A1 and which claims the priority of German Patent Application Serial No. 10 2008 060 695.5, filed Dec. 8, 2008, and German Patent Application Serial No. 10 2009 030 101.1, filed Jun. 22, 2009, pursuant to 35 U.S.C. 119(a)-(d).

BACKGROUND OF THE INVENTION

The instant invention relates to a wear protection layer on the basis of a synthetic resin matrix, to a method for the production thereof and to the use thereof.

It is well known to seal surfaces of furniture, floors, ceramics or other articles of daily use, which consist of the most versatile materials, so as to protect the surface on the one hand and so as to give a decorative appearance to the surface on the other hand. The most versatile matrix materials are used to reduce the sensitivity of the surface to mechanical, thermal or chemical stress and to give it a decorative appearance at the same time, whereby these are oftentimes duroplastic, thermoplastic or elastomer synthetic materials, which can be hardened by means of exposure to temperature or by means of irradiation.

It is also well known to give a decorative appearance to the surfaces of furniture, floors, etc. by applying so-called high-pressure laminates. The laminate thereby mostly consists of three different layers, namely a colored or imprinted décor paper, a transparent overlay paper located thereabove and one or a plurality of so-called core papers, which are located therebelow and which serve as support for the décor paper and the overlay paper. Typically, all three papers are impregnated with a heat-hardenable synthetic resin.

Further embodiments are known, in the case of which the décor paper is covered with an overlay paper and is hot pressed directly onto a wood fiber board. A method is also known, in the case of which the décor is imprinted directly onto a pretreated and primed wood fiber board and the surface is subsequently coated with a clear lacquer on the basis of acrylates, to which aluminum oxide is added, and is then hardened by means of UV light.

In particular melamine resins, urea resins, phenol resins, acrylate resins, epoxy resins, polyester resins, aminoplasts, polyurethanes as well as mixtures of these components are suitable as heat and/or irradiation-hardenable synthetic resins or lacquer systems, respectively. In the past, attempts were made repeatedly to increase the abrasion resistance of a laminate by storing hard material particles into the resin layer, with which a core-impregnated décor paper is coated, for example.

For instance, a plurality of publications describes corresponding methods for producing abrasion resistant décor layers or laminates, respectively, in the case of which mainly particles based on aluminum oxide are used as suitable hard material particles for producing wear resistant décor layers. The preferred range for the average grain size of the particles is thereby typically between 1 µm and 80 µm.

For instance, U.S. Pat. No. 3,928,706 A describes the production of wear resistant décor layers, which consist of a core paper, a décor paper, a wear layer and an overlay paper. The wear layer consisting of a heat-hardenable synthetic resin comprising hard materials, which are finely distributed therein and which encompass a Mohs hardness of at least 7, is applied either onto a surface of the décor or of the overlay paper. All three papers are impregnated with a heat-hardenable synthetic resin and are processed to form a uniform laminate in the typical manner, in that they are pressed between highly polished die plates at temperatures of approx. 150° C.

EP 0 519 242 A1 describes a wear protection layer of special clarity and brilliance, which can be obtained in that the décor paper is provided with a wear layer, which contains hard materials coated with silane. The processing into the finished laminate also takes place herein by means of pressing.

In all cases, the production of wear resistant laminate surfaces by storing hard materials on décor papers or also the direct coating with hard material-filled liquid overlays leads to a considerable problem in the case of the end production of the laminates, because the surfaces of the die plates or press belts are scratched and are made unusable relatively quickly due to the contact with the hard material particles in response to the discontinuous operation using presses with highly-polished die plates as well as in response to the continuous operation with press belts. The die plate wear is thus a quite substantial cost factor in response in response to the production of wear resistant décor layers.

Attempts to solve the wear problem in response to the production mostly resulted in the avoidance of the direct contact between hard material particles and die plates by means of suitable measures.

For instance, WO 2006/013469 A1 describes a method in the case of which a first layer of the hard material particles is initially applied onto a substrate and a second polymer layer is subsequently applied onto the first abrasion resistant layer, in which particles are stored, which encompass a lower hardness, but also a lower abrasiveness, for which glass spheres or glass fibers can be used.

EP 1 319 524 A1 describes a similar way in the case of which the object is solved in that lacquer or impregnating resin systems are used, which include glass spheres, for example, which encompass a useable hardness, but a low intrinsic abrasiveness, as mentioned above.

WO 02/066265 A1 describes a method for producing a décor paper, in the case of which abrasion resistant particles, such as aluminum oxide or silicon carbide, e.g., which are stored in the resin, are coated with glass spheres or glass fibers in an additional operating step, so as to thus avoid the direct contact of the aluminum oxide or silicon carbide particles with the mirror surface of the press and so as to avoid damages. The spheres or fibers are to thereby ensure the desired distance between the abrasion resistant particles and the die plate or the press belt, respectively.

EP 1 339 545 B1 describes a wear protection layer on the basis of synthetic resin, wherein substantially cutting edge-free round solid material particles in the form of spheres comprising a lower hardness than that of the hard material particles are stored in the synthetic resin system in addition to the hard material particles. The average particle diameter of the spheres is thereby greater than the average grain diameter of the hard material particles. It is attained with this that the direct contact of the press die surface with the hard material particles is avoided and the round solid material particles quasi act as spacers.

The above-described methods, which mainly serve to protect the press dies, have the disadvantage that even though the tools, press dies or press belts are now saved by storing particles comprising a low intrinsic abrasiveness in the outer area of the décor layer, experience shows that the wear resistance of the layer is reduced.

WO 2008/128702 A1 describes a wear protection layer, in the case of which the hard material particles responsible for the wear resistance are partially replaced by less hard, substantially cutting edge-free and round solid material particles, such as full spheres made of glass, e.g. Provision is thereby made for the particle diameters of the round solid material particles to be the same or smaller than the particle diameters of the hard material particles. In so doing, the wear resistance of the décor layer remains up to a certain degree of substitution, wherein the relatively expensive hard material particles can be partially replaced by cheaper glass spheres, and a certain protection for the press dies is attained at the same time. However, the use of glass spheres with the same size or smaller has the disadvantage that overlay papers must still be used again additionally for the protection of the press dies, which in turn increases the costs of the production method.

SUMMARY OF THE INVENTION

The problem thus remains to optimize wear protection layers as well as methods for the production thereof with reference to costs and to thereby optimize the abrasion resistance in cooperation with the wear of the tools caused by the abrasiveness of the layer in response to the production thereof.

The object is solved by means of a wear protection layer that includes a mixture of non-uniform transparent hard material particles, stored in a synthetic resin matrix and comprises a Mohs hardness of at least 6 and transparent solid material particles comprising a Mohs hardness of at least 3, wherein the hard material particles and the solid material particles are different materials and the transparent solid material particles are at hand in a bi-model grain size distribution in each with a coarse fraction and a fine fraction, as well as a method comprising the features of applying a first resin suspension as first layer onto a surface; intermediately drying the first layer or gelatinizing the first layer by means of irradiation; applying a second resin suspension onto the pre-dried or still moist, respectively, gelatinized first layer and final drying of the entire coating or hardening of the entire coating by means of irradiation. Advantageous embodiments and further developments are the object of the respective corresponding subclaims.

It was possible to determine that the wear resistance of a décor layer on the basis of a synthetic resin matrix can be increased by using a mixture of non-uniform transparent hard material particles comprising a Mohs hardness of at least 6 and transparent solid material particles comprising a Mohs hardness of at least 3, wherein the transparent solid material particles are at hand in a bi-modal grain size distribution, in each case with a coarse fraction and a fine fraction and that the press die wear or wear of the press belts, respectively, can be reduced at the same time.

Particularly advantageous results can be achieved when the transparent solid materials at least partially comprise substantially cutting edge-free, round transparent solid material particles with a Krumbein roundness of at least 0.8 and a Mohs hardness of at least 3.

An improvement of the brilliance and transparency of the décor layer is thereby additionally attained by substituting non-uniform transparent hard materials with round transparent solid materials. A considerable cost advantage furthermore results in general when replacing expensive hard materials with cheaper transparent solid materials.

In the case of a preferred embodiment of the instant invention, the Mohs hardness of the hard material particles is greater than 7, while the Mohs hardness of the solid material particles lies between 3 and 6.

The non-uniform transparent hard material particles are preferably materials, which are chosen from the group a aluminum oxide, fused alumina, sintered alumina, fully annealed clay or sol-gel aluminum oxide, while the transparent solid material particles are preferably glass beads. However, aluminum silicates or generally sintered ceramics are also possible to be used as transparent solid material particles. Preferably, the synthetic resin matrix contains duroplastic, thermoplastic or elastomer synthetic materials.

The bi-modal grain distribution in the case of the transparent solid material particles is chosen such that the average grain size of the coarse fraction of the transparent solid material particles is at least 40% greater than the average grain size of the fine fraction of the transparent solid material particles and thereby encompasses maximally three times the value of the average grain size of the non-uniform transparent hard material particles.

Depending on the area of use, the percentage of the coarse fraction of the transparent solid material particles, based on the total percentage of the transparent solid material particles, can be between 5% by weight and 95% by weight. In the case of preferred embodiments of the instant invention, the percentage of the coarse refraction of the transparent solid material particles lies between 10% by weight and 50% by weight, that is, the coarse fraction is maximally half of the solid material particles, and in the case of a particularly preferred embodiment, the percentage of the coarse fraction lies between 15% by weight and 30% by weight, again based on the total percentage of the transparent solid material particles.

Due to the fact that the addition of transparent solid material particles to the non-uniform transparent hard material particles can provide for improvements to the characteristics of the décor layer across a wide range, depending on the area of application, provision is made according to the invention for the percentage of transparent solid material particles in the stored total mixture of hard and solid material particles to be 1% by weight to 99% by weight, but preferably 20% by weight to 60% by weight, and particularly preferred 30% by weight to 50% by weight, based on the total percentage of the stored particles. It is to be documented with this that the transparent solid material particles in the range of between 30% by weight and 50% by weight, based on the total percentage of the stored particles, are used for the common applications, but that, depending on the area of application, it may also be sensible to use considerably smaller or greater percentages of transparent solid material particles in addition to the non-uniform hard material particles.

In addition, the transparency and also the color of the layer can be impacted by the transparent solid material particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B according to a preferred embodiment of the instant invention.

The total quantity of stored non-uniform transparent hard material particles and transparent solid material particles in the synthetic resin matrix is typically between 5% by volume and 70% by volume, based on the total volume of the wear protection layer. The total quantity of stored hard material particles and solid material particles is between 2 g/m² and 100 g/m², preferably 10 g/m² to 50 g/m².

It is known that the transparency of wear protection layers, in which transparent hard material or solid material particles are stored, can be improved by means of a chemical surface treatment of the hard material or solid material particles with an organic or inorganic bonding agent. For instance, a preferred embodiment of the instant invention provides for the non-uniform transparent hard material particles and the transparent solid material particles to be subjected to a chemical surface treatment with an organic or inorganic bonding agent prior to the introduction into the synthetic resin matrix, wherein the bonding agent is preferably a silane, in particular an organosilane, such as an aminoalkylsilane or an aminoalkylalkoxysilane from the group of aminopropyltrimethoxysilane, 3-aminopropyltriethoxysilane, 3-aminopropylmethyldimethoxysilane, 3-aminopropylmethyldiethoxysilane and N-(2-aminoethyl)-3-aminopropyltrimethoxysilane. The percentage of silane is thereby typically between 0.001% by weight and 5% by weight, based on the total percentage of hard material particles and solid material particles.

In the context of numerous optimization attempts, it was also determined that particularly positive effects are achieved when the transparent non-uniform hard material particles and the transparent solid material particles in the synthetic material matrix are arranged on top of one another in a plurality of layers. To ensure this arrangement, it can be advantageous to apply the wear protection layer in a plurality of steps (layers), depending on the loading density of the matrix with solid material and hard material particles.

The object of the instant invention is thus also a method for producing a wear protection layer, wherein the method comprises the following steps:
  a) applying a first resin suspension as first layer onto a surface;
  b) intermediately drying the first layer or gelatinizing the first layer by means of irradiation;
  c) applying a second resin suspension onto the pre-dried first layer and;
  d) final drying of the entire coating or hardening of the entire coating by means of irradiation.

Electron or UV rays can be used, for example, for gelatinizing and hardening.

Particularly good protective effects are achieved when either the first or the second resin suspension comprises the coarse fraction of the transparent solid material particles together with the non-uniform transparent hard material particles, while the respective other resin suspension comprises the fine fraction of the transparent solid material particles without additional hard material particles.

This method is suited, in particular, for the production of wood fiber boards, which are provided with a décor, wherein the surface for the application of the first suspension is a core-impregnated décor paper in this case, which is coated with a second resin suspension at temperatures of between 120° C. and 160° C. after an intermediate drying, with said second resin suspension being applied onto the layer comprising the first pre-dried resin suspension, after which a final drying then also takes place in a temperature range of between 120° C. and 160° C. and the dried décor paper, which still contains a residual moisture of approx. 5% to 9%, is press-fitted on a wood fiber board.

The use of a wear protection layer for producing wear resistant surfaces on wood materials, on impregnated décor papers, on wood fiber boards imprinted with décor, on cork, on CV and polyvinylchloride coverings, on parquet floors, floor laminates, furniture surfaces or work surfaces, is also the object of the instant invention.

The instant invention will be defined below in detail by means of select examples.

Applications in the field of laminates were chosen, because the evaluation of the wear resistance (abrasion resistance) is standardized in this field and a comparability of the individual tests is thus possible. This selection, however, is not to be seen as a limitation. Instead, it became apparent in the context of the tests that comparable relationships are also at hand in the case of the other discussed systems.

The above-discussed standard conditions for laminate floors pertain to the so-called Taber test, by means of which the resistance as compared to abrasion is determined and the floors are divided into abrasion classes. The resistance of the cover layer as compared to wear-through is determined in this test. The abrasion is attained in that a test piece rotates under stressed, cylindrical friction wheels, which are covered with defined sandpaper. The number of rotations necessary up to a predetermined degree of the abrasion is measured thereby.

For this test according to DIN EN 13329, test piece comprising a size of approximately 100 mm×100 mm are removed from a laminate floor element and are divided into 4 quadrants by means of a marker. The surface of the test piece is processed under accurately defined conditions (pressure, rotations, etc.) by means of two friction wheels, which are covered with a defined sandpaper, wherein the sandpaper strips are replaced in each case after 200 rotations. The test is continued until a so-called initial abrasion point (IP) has been reached. The initial abrasion point (IP) is the point at which the appearance of a wear-through of the décor print can be seen clearly for the first time and at which the bottom layer is exposed in three of the four quadrants. In so doing, the laminate floors are divided into abrasion classes between AC-1 to AC-5, which corresponds to an IP value of ≥900 to ≥6000.

The select examples will be evaluated below by means of the Taber values, wherein the specified Taber values are the average values of 4 Taber tests in each case.

EXAMPLES 1 TO 5

Resin suspensions comprising the following compositions were used for examples 1 to 5:

Resin Suspension A

| Quantity (g) | Connection | Identification, Manufacturer |
|---|---|---|
| 100 | Melamine resin | MF Dynea Prefère, 70 0562L, Dynea, A-Krems |
| 5 | Monoethylglycol | MEG, Roth |
| 0.86 | Hardener | MH 188, Melatec, CH-Zug |
| 0.19 | Surfactant | MN 49/S, Melatec, CH-Zug |
| 0.05 | Separating agent | MT 673/SP, Melatec, CH-Zug |

The above-specified resin suspension A is used for core impregnating the décor paper, while the resin suspension B, the composition of which is combined in the table below, is used for the application of the hard materials or solid materials, respectively.

Resin Suspension B

| Quantity (g) | Connection | Identification, Manufacturer |
|---|---|---|
| 100 | Melamine resin | MF Dynea Prefère, 70 0562L, Dynea, A-Krems |
| 6 | Monoethylglycol | MEG, Roth |
| 0.93 | Hardener | MH 188, Melatec, CH-Zug |
| 0.6 | Surfactant and dispersing agent | MN 2000/B, Melatec, CH-Zug |
| 0.5 | Separating agent | MT 673/SP, Melatec, CH-Zug |

White aluminum oxide (ALODUR® ZWSK-ST 180, Treibacher Schleifmittel GmbH, D-Laufenburg) was used as non-uniform transparent hard material, while glass beads by Swarco and Sovitec were used as transparent solid materials. The hard material as well as the solid material particles was silanized prior to the use thereof. The sieve analyses and bulk densities of the used hard or solid materials, respectively, are combined in a table below.

| Sieve (μm) | Hard material ALODUR® ZWSK-ST 180 | Solid material (coarse fraction) SWARCO 90-150 μm | Solid material (fine fraction) SOVITEC 45-63 μm |
|---|---|---|---|
| 150 |  | 4.8 |  |
| 125 | 0 | 44.2 |  |
| 106 | 8 |  |  |
| 90 | 57 | 48.3 |  |
| 75 | 28 | 2.0 | 0 |
| 63 | 6 | 0.5 | 0 |
| 53 |  |  | 16.3 |
| 45 |  |  | 20.4 |
| 32 |  |  | 33.1 |
| Floor | 1 | 0.2 | 30.2 |
| SD (g/cm³) | 1.94 | 1.44 | 1.41 |

EXAMPLE 1 (Comparison)

A décor paper was core-impregnated with the resin suspension A. A coating of the décor paper with the suspension B, which contained 38% by weight of ALODUR® ZWSK-ST 180 as hard material was carried out subsequently. The décor paper was then dried at 145° C. to a residual moisture of 6.4%. The décor paper was subsequently covered with an overlay paper, which was impregnated and dried with the resin suspension B, and was press-fitted onto a wood fiber board at 180° C. for 12 seconds under a pressure of 350 N.

EXAMPLE 2 (Comparison)

Analogous to example 1, a core-impregnated moist décor paper was used, which was coated with a resin suspension B, which contained 38% by weight of a mixture consisting of 90 percent by weight of a non-uniform transparent hard material (ALODUR® ZWSK-ST 180) and 10 percent by weight of glass beads (Swarco 90-150 μm). After the drying of the décor paper at 145° to a residual moisture of 6.4%, the décor paper was covered with an overlay paper, which was impregnated and dried with the resin suspension B, and was press-fitted onto an HDF wood fiber board at 180° C. for 12 seconds under a bonding pressure of 350 N.

EXAMPLE 3 (Comparison)

Analogous to example 2, the coating the core-impregnated décor paper took place with the resin suspension B, which contained 38% by weight of a mixture consisting of 90 percent by weight of a non-uniform transparent hard material (ALODUR® ZWSK-ST 180) and 10 percent by weight of round transparent solid materials (glass beads Swarco 90-150 μm). After the intermediate drying for 30 seconds at 145° C., a second coating with a pure resin suspension B took place. After the final drying of the twice-coated décor paper at 145° C. to a residual moisture of 6.6%, the press-fitting of the décor paper onto an HDF wood fiber board took place at 180° C. for 12 seconds under a pressure of 350 N.

EXAMPLE 4 (Comparison)

Analogous to example 2, a core-impregnated moist décor paper was used, which was coated with a resin suspension B, which contained 38% by weight of a mixture of 50 percent by weight of a non-uniform transparent hard material (ALODUR® ZWSK-ST 180) and 50 percent by weight of glass beads (Swarco 90-150 μm). A second coating with a pure resin suspension B took place after the intermediate drying for 30 seconds at 145° C. After the final drying of the twice-coated décor paper at 145° C. to a residual moisture of 6.4%, the press-fitting of the décor paper onto an HDF wood fiber board took place at 180° C. for 12 seconds under a pressure of 350 N.

EXAMPLE 5 (Invention)

The core impregnation of the décor paper took place as in examples 1 to 4. The core-impregnated moist décor paper was subsequently coated with a resin suspension B, which contained 38% by weight of a mixture of 85 percent by weight of a non-uniform hard material (ALODUR® ZWSK-ST 180) and 15 percent by weight of a round transparent solid material (glass beads Swarco 90-150 μm). After an intermediate drying at 145° C. for 30 seconds, a second coating with a resin suspension B took place, which contained 35% by weight of a round transparent solid material (glass beads Sovitec 45-63 μm). After the final drying of the twice-coated décor paper at 145° C. to a residual moisture of 6.7%, the décor paper was pressed onto an HDF wood fiber board at 180° C. for 12 seconds under a pressure of 350N.

Test of the Abrasion Resistance (Taber Test)

The results of the abrasions tests of the laminate test pieces are combined according to examples 1 to 5 in Table 2 below.

| Example | Taber values (IP = rotations) Coverage density | Taber values based on 1 g/m² of hard material and solid material particles (% by weight of glass beads) | Taber values based on 1 g/m² of hard material particles (ALODUR ZWSK-ST 180) |
|---|---|---|---|
| 1 | 5,500 24 g/m² | 229 0.0% by weight | 229 |
| 2 | 5,600 25 g/m² | 224 10% by weight | 248 |
| 3 | 5,500 25 g/m² | 220 10% by weight | 244 |
| 4 | 4,000 24 g/m² | 167 50% by weight | 334 |
| 5 | 5,600 26 g/m² | 215 50% by weight | 430 |

Column 2 of Table 2 represents the Taber values (IP) together with the coverage density (g/m²) determined during the wear test. The coverage density is the quantity of hard material plus solid material particles per m² of décor layer. It can be seen that the wear resistance of the layer does not decrease when 10% of hard material particles are replaced with glass beads at the same coverage density. When replacing 50% by weight of the hard material particles with the coarse fraction of the glass beads, a considerably decrease of the abrasion resistance can be seen (example 4).

The result of example 5, in which 50% by weight of the hard materials are replaced by glass beads, wherein the glass beads in this case additionally encompass a bi-modal grain distribution and the coating of the décor layer was furthermore carried out in two steps, and the solid and hard material particles are thus arranged in a plurality of layers in the coating, is thus all the more surprising. For instance, a decrease of the Taber values cannot be seen, despite the substitution of the hard materials with glass beads, and almost a doubling of the Taber values is reached when the result is based solely on the percentage of used hard material particles.

This result signifies extraordinary progress, because up to 50% by weight of the hard material particles can now be replaced with glass spheres, without resulting in a decrease of the wear resistance (abrasion resistance), wherein, in addition to the cost advantage, which is reached by replacing the expensive hard materials with cheap glass beads, it is to be mentioned as further advantages that the transparency and brilliance of the décor layer increases, that the die plate wear can be reduced and that the process control is generally facilitated, because the processing of the glass beads requires a lower sensitivity of the process.

EXAMPLES 6 To 9

The same resin suspensions were used in examples 6 to 9 as in examples 1 to 5.

For instance, the core impregnation of the décor paper took place with the resin suspension A, while the coatings were subsequently carried out on the basis of the resin suspension B.

The hard material types or solid material types, respectively, were also maintained. The sievings, however, were changed. The sieve analyses and bulk densities of the hard and solid materials are combined in Table 3 below.

TABLE 3

| Sieve (μm) | Hard material ALODUR® ZWSK-ST F280 | Solid material (coarse fraction) SWARCO 75-106 μM | Solid material (fine fraction) SOVITEC 45-63 μm |
| --- | --- | --- | --- |
| 150 | | | |
| 125 | 0 | 0.1 | |
| 106 | | | |
| 90 | 4.9 | 48.3 | |
| 75 | 9.4 | 37.6 | 0 |
| 63 | | | 0 |
| 53 | 5.3 | 13.7 | 16.3 |
| 45 | 8.9 | 0.2 | 20.4 |
| 32 | | | 33.1 |
| Floor | 75.1 | 0.1 | 30.2 |
| SD (g/cm³) | 1.77 | 1.42 | 1.41 |

EXAMPLE 6 (Comparison)

Analogous to example 1, a décor paper was initially core-impregnated with the resin suspension A. The coating of the décor paper was subsequently carried out with the suspension B, which contained 48% by weight of the non-uniform transparent hard material (ALODUR® ZWSK-ST F280). The décor paper was then dried to a residual moisture of 6.4% at 145° C., was subsequently impregnated with the resin suspension B and was covered with dried overlay paper and was then press-fitted onto an HDF wood fiber board at 180° C. for 12 seconds under a pressure of 350 N.

EXAMPLE 7 (Comparison)

Analogous to example 6, the décor paper was again initially core-impregnated with the resin suspension A and was subsequently coated with the resin suspension B, which contained 48% by weight of a mixture consisting of 80 percent by weight of the non-uniform transparent hard material particles (ALODUR® ZWSK-ST F280) and 20 percent by weight of round transparent solid material particles (glass beads, Swarco 75-100 μm). The décor paper coated in such a manner was subsequently dried at 145° C. and was then impregnated with the resin suspension B and was covered with dried overlay paper and was dried at 180° C. for 12 seconds and under a pressure of 350 N.

EXAMPLE 8 (Invention)

The preparation of the décor paper took place as in all previous examples, wherein the core-impregnated moist décor paper was subsequently coated with a resin suspension B, which contained 40% by weight of a mixture of 80 percent by weight of the non-uniform transparent hard material particles (ALODUR® ZWSK-ST F280) and 20 percent by weight of round transparent solid material particles (glass beads, Swarco 75-106 μm). The décor paper coated in such a manner was subjected to an intermediate drying at 145° C. and 30 seconds later, the décor paper was subjected to a second coating with a resin suspension B, which contained 40% by weight of a round transparent solid material (Sovitec 45-63 μm). After the second coating, a final drying of the coated décor paper was carried out at 145° C. to a residual moisture of 6.7%. The final press-fitting of the décor paper onto an HDF wood fiber board took place at 180° C. and under a pressure of 350 N for 12 seconds.

EXAMPLE 9 (Invention)

A décor paper was initially core-impregnated with the resin suspension A as in example 8. Subsequently, the first coating took place with a resin suspension B, which contained 40% by weight of a round transparent solid material (Sovitec 45-63 μm). After the intermediate drying at 145° C. for 30 seconds, a second coating took place with a resin suspension B, which now contained 40% by weight of a mixture of 80 percent by weight of a non-uniform transparent hard material (ALODUR® ZWSK-ST F280) and 20 percent by weight of a round transparent solid material (Swarco 75-106 μm). After the final drying of the twice-coated décor paper at 145° C. to a residual moisture of 6.7%, the final press-fitting onto an HDF wood fiber board took place at 180° C. and under a pressure of 350 N for 12 seconds.

The results of the test of the abrasion resistance of the laminates produced in such a manner are combined in Table 4 below.

TABLE 4

| Example | Taber values (IP = rotations) Coverage density | Taber values based on 1 g/m² of hard material and solid material particles (% by weight of glass beads) | Taber values based on 1 g/m² of hard material particles (ALODUR ZWSK-ST F280) |
|---|---|---|---|
| 6 | 2,800<br>25 g/m² | 112<br>0.0% by weight | 112 |
| 7 | 3,100<br>26 g/m² | 119<br>20% by weight | 149 |
| 8 | 3,100<br>27 g/m² | 115<br>40% by weight | 191 |
| 9 | 4,400<br>25 g/m² | 176<br>40% by weight | 293 |

It can be seen from the values of Table 4 that the substitution of the non-uniform transparent hard material with round transparent solid material particles provides for an improvement of the wear resistance of the layer. For instance, only a Taber value of 2800 is reached with the use of fine hard material particles alone, while a substitution of 20% of the non-uniform transparent hard materials with round transparent solid materials, which are at least partially coarser than the hard materials, leads to an increase of the wear resistance to 3100. A further substitution of the hard materials with round transparent solid materials, wherein the décor layer is applied in two steps, is successful in particular when a resin suspension with the fine fraction of the round transparent solid materials is initially applied and a suspension with the hard materials and the coarse fraction of the transparent round solid materials is applied subsequently. An increase of the wear resistance to a Taber value of 4400 can be reached in this case in response to a substitution of 40% by weight of the hard materials with round transparent solid materials in a bi-modal distribution, which almost compares with a doubling as compared to the product from example 6, in which glass beads are not used.

In addition, there is the cost advantage by replacing the expensive hard material with the cheaper solid material as well as the quality improvement with reference to brilliance and transparency of the décor layer. However, the arrangement of the hard materials close to the surface seems to be a disadvantage with reference to the die plate wear herein. Tests have shown that this disadvantage can be avoided in that this layer design of the particles is illustrated in reverse order on an overlay paper, wherein the particle-free surface of the overlay paper then protects the die plates in the known manner, while still reaching a comparably high Taber value.

Even though a positive effect can also be seen in the case of the reverse sequence of the layer application onto décor paper, in the case of which the mixture of hard materials with the coarse fraction of the round transparent solid materials is initially applied and in the case of which the fine fraction of the round transparent solid materials is subsequently applied as suspension (example 8), this positive effect remains limited to ensuring that the abrasion resistance remains despite substitution of the hard materials, so that in particular a cost advantage is at hand by replacing the expensive hard material with cheaper solid materials and the wear protection for the die plate is at hand.

Surprisingly, it was furthermore determined that improvements as compared to the state of the art can be attained even if partially or completely non-uniform transparent solid material particles are used instead of the substantially cutting edge-free round transparent solid material particles when the totality of the solid material particles is at hand in a bi-modal grain distribution, in each case with a coarse fraction and a fine fraction. Mixtures of substantially cutting edge-free round transparent solid material particles, such as full glass spheres, comprising non-uniform transparent solid material particles, can also be used, wherein advantageous results are achieved as long as the mixtures are at hand in a bi-modal grain distribution, in each case with a coarse and a fine fraction.

The use of non-uniform transparent solid materials is described in examples 10 to 16.

EXAMPLES 10 To 16

The previously described resin suspensions A and B were also used for examples 10 to 16.

The resin suspension A was thereby used for the core impregnation of the overlay paper and of the décor paper, while the resin suspension B was used for the application of the hard materials or of the solid materials, respectively.

White aluminum oxide (ALODUR® ZWSK-ST 200, Treibacher Schleifmittel GmbH, D-Laufenburg) was used as non-uniform transparent hard material, while glass beads by Swarco and Sovitec were used as round transparent solid material and quartz sand by Quarzwerke Frechen were used as non-uniform transparent solid material. The hard material as well as the solid material particles was silanized prior to the use thereof. The sieve analyses and bulk densities of the used hard or solid materials, respectively, are combined in a table below.

TABLE 5

| Sieve (μm) | Hard material<br>Aluminum oxide<br>ALODUR ®<br>ZWSK-ST 200 | Solid material<br>Glass beads<br>coarse<br>SWARCO<br>90-150 μm | Solid material<br>Glass beads<br>Fine<br>SOVITEC<br>0-50 μm | Solid material<br>Quartz sand<br>Coarse<br>QW Frechen<br>90-150 μm | Solid material<br>Quartz sand<br>Fine<br>QW Frechen<br>0-50 μm |
|---|---|---|---|---|---|
| 150 | | 4.8 | | 7.8 | |
| 125 | 0.0 | 44.2 | | 47.7 | |
| 106 | 6.0 | | | | |
| 90 | 30.0 | 48.3 | | 37.6 | 0.5 |
| 75 | | 2.0 | 0.1 | | 2.5 |
| 63 | | 0.5 | 0.2 | 6.9 | 2.6 |
| 53 | 59.0 | | 9.5 | | 46.8 |
| 45 | 3.0 | | 19.8 | | 24.8 |
| 32 | | | 31.7 | | |
| Floor | 2.0 | 0.2 | 38.7 | 0.0 | 22.8 |
| SD (g/cm³) | 1.94 | 1.44 | 1.36 | 1.31 | 0.99 |

EXAMPLE 10 (Comparison)

An overlay paper was, core-impregnated with the resin suspension A. A coating of the overlay paper with the suspension B, which contained 40% by weight of ALO-DUR® ZWSK-ST 200 as hard material, took place subsequently. The overlay paper was then dried at 145° C. to a residual moisture of 6.0%. Subsequently, a décor paper, which was impregnated with the resin suspension A and which was dried, was covered with the overlay paper with the grain side pointing downwards and was press-fitted onto an HDF wood fiber board at 180° C. for 12 seconds under a pressure of 350 N.

EXAMPLE 11 (Invention)

Analogous to example 10, the coating of the core-impregnated overlay paper took place with the resin suspension B, which contained 40 percent by weight of a mixture consisting of 60 percent by weight of a non-uniform transparent hard material (ALODUR® ZWSK-ST 200), 15 percent by weight of a coarse fraction of round transparent solid materials (glass beads Swarco 90-150 µm) and 25 percent by weight of a fine fraction of round transparent solid materials (glass beads fine Swarco 0-50 µm). After the drying of the coated overlay paper at 145° C. to a residual moisture of 5.8%, the press-fitting of the overlay paper took place with the grain side pointing downwards onto a décor paper and onto an HDF wood fiber board at 180° C. for 12 seconds under a pressure of 350 N.

EXAMPLES 12 to 16 (Invention)

Examples 12 to 16 were carried out analogous to example 11.

The respective composition of the hard material with the fine materials (glass beads and/or quartz sand) in the coarse or fine fraction, respectively, can be found in Table 6 below:

TABLE 6

| Example | Hard material (% by weight) Aluminum oxide ALODUR® ZWSK-ST 200 µm | Solid material (% by weight) Coarse fractions 90-150 µm | Solid material (% by weight) Fine fractions 0-50 µm |
|---|---|---|---|
| 10 | 100% | — | — |
| 11 | 60% | 15% glass beads | 25% glass beads |
| 12 | 60% | 15% glass beads | 12.5% glass beads |
|    |     |                  | 12.5% quartz sand |
| 13 | 60% | 15% glass beads | 25% quartz sand |
| 14 | 60% | 7.5% glass beads | 25% glass beads |
|    |     | 7.5% quartz sand |                 |
| 15 | 60% | 7.5% glass beads | 25% quartz sand |
|    |     | 7.5% quartz sand |                 |
| 16 | 60% | 15% quartz sand  | 25% quartz sand |

Test of the Abrasion Resistance (Taber Test)

The results of the abrasion tests of the laminate test pieces according to examples 10 to 16 are combined in Table 7 below.

| Example | Taber values (IP = rotations) Coverage density | Taber values based on 1 g/m² of hard material and solid material particles (% by weight of solid particles) | Taber values based on 1 g/m² of hard material particles (ALODUR ZWSK-ST 200) |
|---|---|---|---|
| 10 | 4,400 25 g/m² | 176 (0% G, S, g, s) | 176 |
| 11 | 4,375 25 g/m² | 175 (15% G, 25% g) | 291 |
| 12 | 2,950 25 g/m² | 118 (15% G, 12.5% g, 12.5% s) | 197 |
| 13 | 4,225 25 g/m² | 169 (15% G, 25% s) | 281 |
| 14 | 3,200 25 g/m² | 128 (7.5% G, 7.5% S, 25% g) | 213 |
| 15 | 3,150 25 g/m² | 126 (7.5% G, 7.5% S, 25% s) | 210 |
| 16 | 3,275 25 g/m² | 131 (15% S, 25% s) | 218 |

Remarks relating to Table 7:
a) G = glass beads coarse percentage
b) g = glass beads fine percentage
c) S = quartz sand coarse percentage
d) s = quartz sand fine percentage Column 2 of Table 7 represents the Taber values (IP), which are determined in response to the wear test, together with the coverage density (g/m²). The coverage density is the quantity of hard material plus solid material particles per m² of décor layer. It can be seen in example 11, in which 40% by weight of the hard materials are replaced with glass beads, that there is virtually no decrease of the Taber value despite the substitution of the hard materials with glass beads.

Even though the abrasion resistance deteriorates in response to the substitution of the glass beads with quartz sand (examples 12 to 16), these alternatives have a considerable commercial interest, because the costs for quartz sand as compared to the glass beads are considerably lower. For instance, a more favorable price/performance ratio is already attained when replacing the hard materials with glass beads in response to the production of laminate floors, which can be further improved by the additional substitution of the glass beads with quartz sand. A particularly advantageous alternative is represented in example 13, in the case of which only the fine percentage of the glass beads was substituted and it was still possible to reach a Taber value, which is comparable to the Taber value when exclusively using glass beads (example 11).

Column 4 of Table 7 represents the Taber values, based on the use of 1 g of hard material per m² of décor surface, which can be used as guide for the price/performance ratio. As is shown in example 16, a respectable Taber value can still be reached even when completely replacing the glass beads with quartz sand. In general, it must be considered in the case of these observations that correspondingly favorable price/performance ratios can only be reached when the transparent solid material (glass beads and/or quartz sand), which is combined with the hard materials, is at hand in a bi-modal grain distribution.

The bi-modality of the grain distribution of the transparent solid materials with a coarse and a fine fraction must thereby be interpreted such that the totality of all of the different transparent solid materials, viewed as a mixture, are at hand in a bi-modal grain distribution, wherein the coarse and/or the fine fraction can in each case comprise different or similar transparent solid materials.

A disadvantage, which was recognized in the course of the tests, was that considerable dust problems arose in response to the processing of the total mixtures, which were mainly caused by the fine fraction of the glass beads and/or of the quartz sands. In addition to the exposure to dust in the work area, fine dust deposits also appeared on the impregnated papers, so that not only the work conditions but also the product quality suffered.

It was possible to solve this problem with the use of silanized, transparent, glass-like, molten barium titanate glass spheres based on barium oxide, titanium dioxide, silicon dioxide, calcium oxide, zinc oxide and aluminum oxide. For this purpose, molten spheres by Swarco were used in examples 17 and 18 with the composition 43.5% by weight of barium oxide, 34.5% by weight of titanium dioxide, 12.5% by weight of silicon dioxide, 4.5% by weight of calcium oxide, 1.5% by weight of zinc oxide and 1.5% by weight of aluminum oxide comprising a density of 4.3 kg/l, which is characterized by a considerably reduced formation of dust.

EXAMPLES 17 and 18

Example 17 was carried out analogous to example 11 and example 18 was carried out analogous to example 15. Instead of using the glass beads or the quartz sand, respectively, as fine fraction of the bi-modal solid material mixture, the transparent highly dense molten spheres on the basis of Ba—Ti—Si—Ca oxide comprising a low percentage of Al and Zn oxide were used.

The results of the abrasion test are illustrated in Table 8 below.

TABLE 8

| Example | Taber values (IP = rotations) Coverage density | Taber values based on 1 g/m² of hard material and solid material particles (% by weight of solid particles) | Taber values based on 1 g/m² of hard material particles (ALODUR ZWSK-ST 200) |
|---|---|---|---|
| 11 | 4,375 25 g/m² | 175 (15% G, 25% g) | 291 |
| 17 | 4,425 25 g/m² | 177 (15% G, 25% BaTi-g) | 295 |
| 18 | 3,275 25 g/m² | 131 (7.5% G, 7.5% S, 25% BaTi-g) | 218 |

Remarks relating to Table 8:
a) G = glass beads (density 2.5 kg/l) coarse percentage
b) S = quarts sand (density 2.65 kg/l) coarse percentage
c) g = glass beads (denisty 2.5 kg/l) fine percentage
d) BaTi-g = glass beads (density 4.3 kg/l) fine percentage (Ba—Ti—Si—Ca oxide)

In addition to the considerably reduced exposure to dust in response to the processing of these total mixtures; it was determined that the Taber values were even slightly improved by using the highly dense barium-titanate spheres as compared to the common soda-lime glass spheres or the quartz sands.

It can be determined as conclusion of these test series that the transparent solid materials can consist of different, round and cutting edge-free and/or non-uniform materials. It is important that the totality of these materials is at hand in a bi-modal grain distribution, consisting of a coarse and a fine fraction.

Even if only wear protection coatings for laminate floors were described in the case of the above examples, this should not be considered to be a limitation, but the cause of this is solely that standardized test methods are available in this field for emphasizing the advantages of the wear protection layer according to the invention. For instance, the wear protective layer according to the invention can also be used advantageously for producing wear resistant surfaces on cork, wear resistant flooring, parquet floors, furniture surfaces and worktops.

Select values and results, which are specified in the examples, will be additionally defined below by means of illustrations.

DETAILED DESCRIPTION OF PREFERRED EMBODIMENTS

Figure 1:
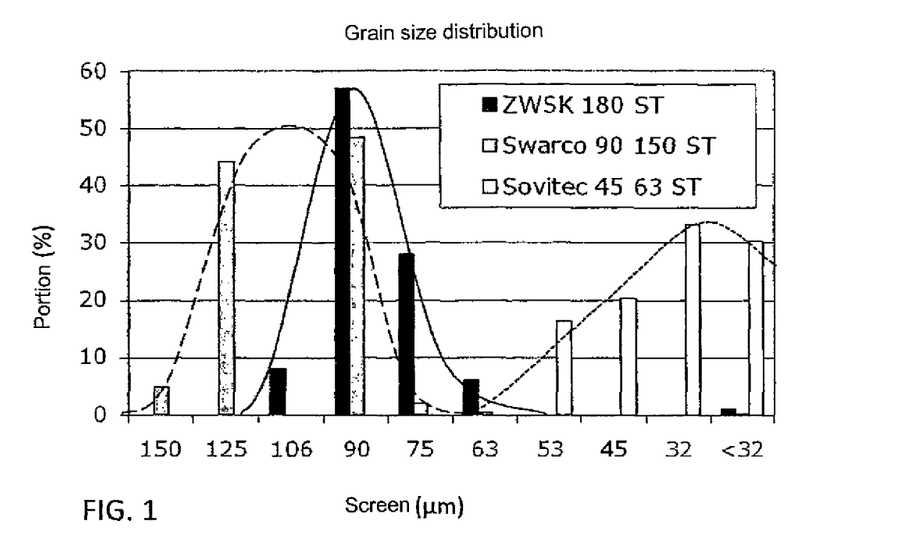
FIG. 1 shows a graphic illustration of the grain distribution curve of the mixture according to Table 1.

FIG. 1 shows the grain size distribution of the non-uniform transparent hard material (ZWSK-ST 180) specified in Table 1 and of the two fractions of a round transparent solid material (Swarco 90-150 μm and Sovitec 45-63 μm). In the instant case, there is no overlapping between the coarse fraction and the fine fraction of the transparent round solid material, wherein the grain size distribution of the hard material is chosen such that it lies between the coarse and the fine fraction of the round transparent solid material. Due to the fact that the coarse fraction of the round transparent solid material is slightly coarser than the grain size of the hard material, the wear of the die plates can be reduced and damages to the die plates can be avoided. The average grain size of the coarse fraction of the transparent round solid material particles is approx. 106 μm and the average grain size of the fine fraction is approximately 30 μm. The average grain size of the coarse fraction is thus considerably coarser than that of the fine fraction.

Figure 2:
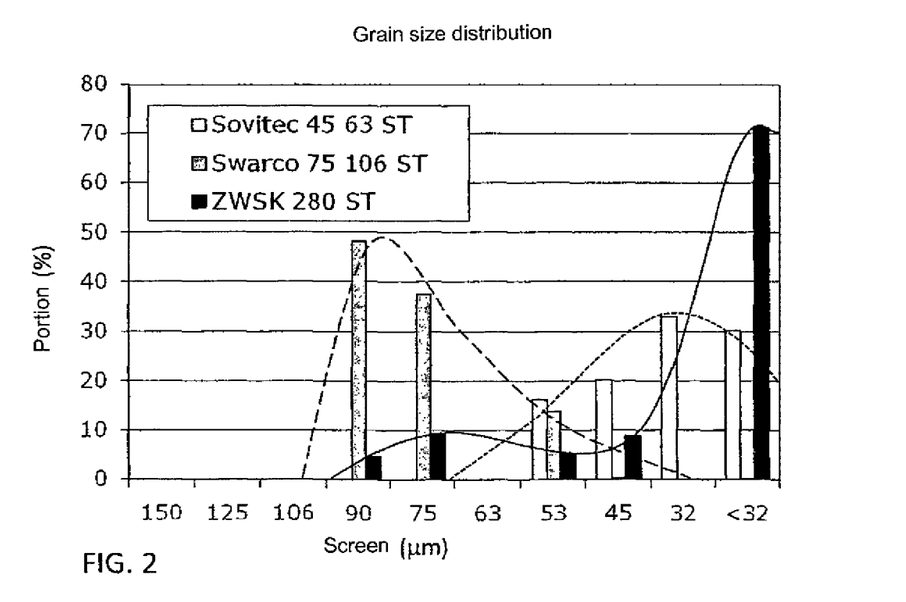
FIG. 2 shows a graphic illustration of the grain distribution curve of the mixture according to Table 3.

FIG. 2 shows the grain size distribution of the mixture of hard materials and solid materials combined in Table 3. It can clearly be seen in the graphic that an overlapping of the two fractions of the round solid material particles takes place in this case, wherein the average grain sizes of the two fractions comprising a value of approx. 80 μm for the coarse fraction and a value of approx. 30 μm for the fine fraction are still far apart and that a considerable bi-modal grain distribution is also at hand here. The hard material encompasses a relatively wide grain distribution, comprising coarse portions of up to 90 μm, while the main percentage, however, lies in the fine range of below 32 μm. In this case, the die plate protection is also again ensured by the coarse fraction of the round transparent solid materials, while the fine fraction acts as a type of filler and thus stabilizes the entire coating.

Figure 3:
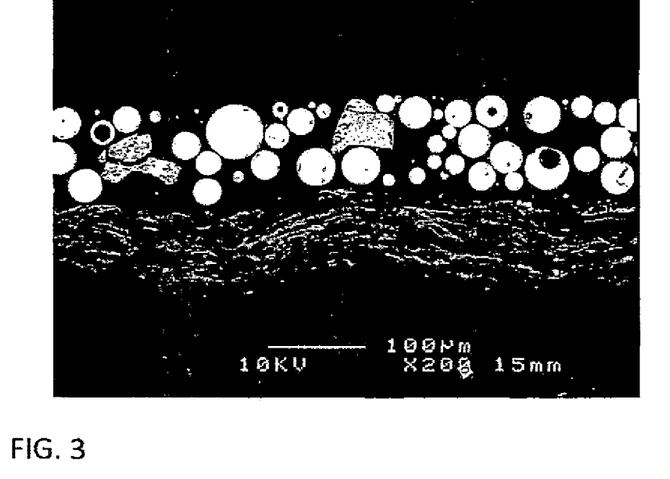
FIG. 3 shows a scanning electron microscopic image of a sectional view of a laminate coating according to example 5.

A scanning electron microscopic image of a sectional view of a wear protection coating according to example 5 can be seen in FIG. 3. The moist décor paper was thereby initially coated with the resin suspension B, which contains 85 percent by weight of non-uniform hard material and 15 percent by weight of the coarse fraction of the round transparent solid material. After an intermediate drying, a second coating with a resin suspension was then carried out, which only contained the fine fraction of the round transparent solid materials.

The hard materials and solid materials can be identified as bright particles. The grain distribution, which can be seen in the sectional view, should correspond to the grain size distribution from FIG. 1 and Table 1. With reference to the proportions, it must be noted herein that the transparent non-uniform hard material encompasses a considerably higher specific weight than the round transparent solid material, so that a clear excess weight of the round solid material is to be expected in terms of volume, even if the distribution of the hard and solid materials in the layer shown in FIG. 3 was 50 percent by weight in each case in terms of volume. The specific weight of the hard material is approximately twice the value of the specific weight of the solid material, which cannot be explained solely by the volume percentages, which can be identified in FIG. 3. It must additionally be considered here that FIG. 3 shows an extremely small section of the entire coating, in which the hard and solid materials are not always distributed homogenously and individual materials can accumulate.

Figure 4:
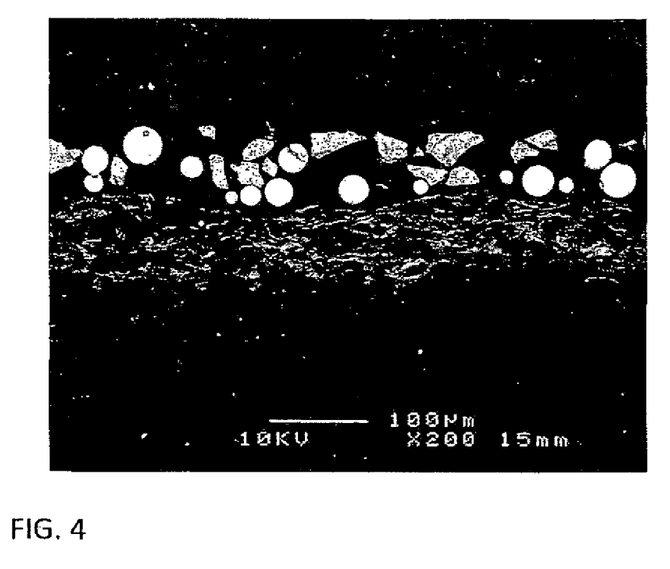
FIG. 4 shows a scanning electron microscopic image of a sectional view of a laminate coating according to example 9.

FIG. 4 shows a scanning electron microscopic image of a cross section of a wear protection layer according to example 9. In this case, a décor paper was coated in two steps, wherein a resin suspension with the fine fraction of the round transparent solid material was initially applied and the layer obtained thereby was coated over after an intermediate drying with a second resin suspension, which contained a mixture of non-uniform transparent hard materials and the coarse fraction of the round transparent solid material. In this case, the grain distribution should correspond to the grain size distribution from FIG. 2 and Table 3. In this case it must also be pointed out that this is a snapshot, which does not clearly represent the used ratio on the one hand and also the scale of the used mixture on the other hand. However, a certain layered separation can be identified in this case between the round transparent solid materials and the non-uniform hard materials, wherein the non-uniform hard materials embody the outer layer of the coating. This, however, would have a disadvantageous effect on the die plate wear, so that this layer design would in particular be suitable for an overlay paper in a reciprocal manner, wherein the overlay paper would then be press-fitted onto the décor paper with the particle side pointing downwards. The particle-free rear side of the overlay paper would thereby protect the die plates.

What is claimed is:

1. A wear protection layer comprising:
a mixture of non-uniform transparent hard material particles comprising a Mohs hardness of at least 6 and transparent solid material particles comprising a Mohs hardness of at least 3 and having a bi-modal grain size distribution with a coarse fraction and a fine fraction, is stored in a synthetic resin matrix in an amount from 5% by volume to 70% by volume based on the entire wear protection layer, wherein the non-uniform transparent hard material particles are silanized white aluminum oxide particles and the transparent solid material particles are glass beads, wherein an average grain size of the coarse fraction of the transparent solid material particles is at least 40% greater than the average grain size of the fine fraction of the transparent solid material particles and no more than three times the value of the average grain size of the non-uniform tranparent hard material particles.

2. The wear protection layer according to claim 1, wherein the transparent solid material particles comprise substantially cutting edge-free round transparent solid material particles with a Krumbein roundness of at least 0.8 and a Mohs hardness of between 3 and 6.

3. The wear protection layer according to claim 1, wherein the percentage of the coarse fraction of the transparent solid material particles, based on the total percentage of coarse and fine fraction of the transparent solid material particles, is between 5% by weight and 95% by weight.

4. The wear protection layer according to claim 3, wherein the percentage of the coarse fraction of the transparent solid material particles, based on the total percentage of coarse and fine fraction of the transparent solid material particles is between 10% by weight and 50% by weight.

5. The wear protection layer according to claim 4, wherein the percentage of the coarse fraction of the transparent solid material particles, based on the total percentage of coarse and fine fraction of the transparent solid material particles, is between 15% by weight and 30% by weight.

6. The wear protection layer according to claim 1, wherein the percentage of coarse and fine fraction of the transparent solid material particles in a total mixture of the non-uniform transparent material particles and the transparent solid material particles is from 1% by weight to 99% by weight.

7. The wear protection layer according to claim 6, wherein the percentage of coarse and fine fraction of the transparent solid material particles in the stored total mixture of the non-uniform transparent hard material particles and transparent solid material particles is from 20% by weight to 60% by weight.

8. The wear protection layer according to claim 7, wherein the percentage of coarse and fine fraction of the transparent solid material particles in the stored total mixture of the non-uniform transparent hard material particles and transparent solid material particles is from 30% by weight to 50% by weight.

9. The wear protection layer according to claims 1, wherein the total amount of the non-uniform transparent hard material particles and the transparent solid material particles in the synthetic resin matrix is from 2 g/m$^2$ to 100 g/m$^2$.

10. The wear protection layer according to claim 9, wherein the total amount of the non-uniform transparent hard material particles and the transparent solid material particles in the synthetic resin matrix is from 10 g/m$^2$ to 50 g/m$^2$.

11. The wear protection layer according to claims 1, wherein the non-uniform transparent hard material particles and the transparent solid material particles have been subjected to a chemical surface treatment with an organic or inorganic bonding agent prior to the introduction into the synthetic resin matrix material.

12. The wear protection layer according to claim 11, wherein the organic or inorganic bonding agent is a silane that is an aminoalkylalkoxysilane selected from the group consisting of 3-aminopropyltriethoxysilane, 3-aminopropylmethyldimethoxysilane, 3-aminopropylmethyldiethoxysilane and N-(2-aminoethyl)-3-aminopropyltrimethoxysilane.

13. The wear protection layer according to claim 12, wherein the percentage of silane is from 0.001% by weight to 5% by weight, based on the total percentage of the non-uniform transparent hard material particles and transparent solid material particles.

14. The wear protection layer according to claim 1, wherein the synthetic resin matrix is a duroplastic, thermoplastic or elastomer synthetic material.

15. The wear protection layer according to claim 1, wherein the non-uniform transparent hard material particles and transparent solid material particles are distributed in the synthetic material matrix in a substantially homogenous manner and are at least partially arranged on top of one another in a plurality of layers.

16. A method of using of a wear protection layer according to claim 1 for producing wear resistant surfaces comprising the step of depositing said mixture of particles on substrates selected from the group consisting of wood materials, impregnated decor papers, wood fiber boards, cork, on CV or polyvinylchloride coverings.

17. A wear protection layer comprising:
a mixture of non-uniform transparent hard material particles, which are stored in a synthetic resin matrix and which comprise a Mohs hardness of at least 6 and transparent solid material particles comprising a Mohs hardness of at least 3, stored in a synthetic resin matrix in an amount from 5% by volume to 70% by volume based on the entire wear protection layer, said transparent solid material having a bi-modal grain size distribution with a coarse fraction and a fine fraction, wherein the non-uniform transparent hard material particles are silanized white aluminum oxide particles and the transparent solid material particles are glass beads, wherein the average grain size of the coarse fraction of the solid material particles is at least 40% greater than the average grain size of the fine fraction of the solid material particles and no more than three times the value of the average grain size of the non-uniform transparent hard material particles, wherein the percentage of coarse and fine fraction of the glass bead particles in the stored total mixture of the silanized white aluminum oxide and the glass bead particles is from 30% by weight to 50% by weight.

* * * * *